US007515614B1

(12) United States Patent
Chengson et al.

(10) Patent No.: US 7,515,614 B1
(45) Date of Patent: *Apr. 7, 2009

(54) SOURCE SYNCHRONOUS LINK WITH CLOCK RECOVERY AND BIT SKEW ALIGNMENT

(75) Inventors: David Chengson, Scotts Valley, CA (US); Joel Frederick Darnauer, Mountain View, CA (US); Matthew A. Tucker, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 395 days.

This patent is subject to a terminal disclaimer.

(21) Appl. No.: 11/400,222

(22) Filed: Apr. 10, 2006

Related U.S. Application Data

(63) Continuation of application No. 09/879,176, filed on Jun. 13, 2001, now Pat. No. 7,061,939.

(51) Int. Cl.
H04J 3/06 (2006.01)
H04L 7/02 (2006.01)
(52) U.S. Cl. ...................... 370/503; 375/359
(58) Field of Classification Search ................. None
See application file for complete search history.

(56) References Cited

U.S. PATENT DOCUMENTS

| | | | | |
|---|---|---|---|---|
| 5,446,765 A | 8/1995 | Leger | ........................... | 375/359 |
| 5,610,953 A * | 3/1997 | Betts et al. | .................. | 375/373 |
| 5,862,180 A * | 1/1999 | Heinz | ......................... | 375/244 |
| 5,878,061 A | 3/1999 | Hauck et al. | ................. | 714/800 |
| 6,233,294 B1 | 5/2001 | Bowers et al. | .............. | 375/356 |
| 6,323,793 B1 | 11/2001 | Howald et al. | .............. | 340/137 |
| 6,463,074 B1 | 10/2002 | Johnson et al. | | |
| 6,493,359 B1 | 12/2002 | Sorgi et al. | ................... | 370/506 |
| 6,549,595 B1 | 4/2003 | Den Besten et al. | ......... | 375/360 |
| 6,618,395 B1 | 9/2003 | Kimmitt | ..................... | 370/473 |
| 6,667,993 B1 * | 12/2003 | Lippett et al. | ............... | 370/509 |
| 6,667,994 B1 | 12/2003 | Farhan | ........................ | 370/535 |
| 6,680,970 B1 * | 1/2004 | Mejia | ......................... | 375/225 |
| 6,738,392 B1 | 5/2004 | Thurston | .................... | 370/503 |
| 6,754,235 B2 | 6/2004 | Van Der Putten et al. | ... | 370/503 |
| 6,845,104 B2 | 1/2005 | Johnson et al. | | |
| 7,061,939 B1 * | 6/2006 | Chengson et al. | ........... | 370/503 |
| 2005/0105547 A1 | 5/2005 | Johnson et al. | | |

OTHER PUBLICATIONS

Co-pending U.S. Appl. No. 10/120,443, filed Apr. 12, 2002; Kong Kritayakirana et al., entitled "Systems and Methods for Routing Data in a Network Device", 28 pages.
Copending U.S. Appl. No. 11/567,414, filed Dec. 6, 2006 for Systems and Methods for Routing Data in a Network Device.

* cited by examiner

*Primary Examiner*—Melvin Marcelo
*Assistant Examiner*—Clemence Han
(74) *Attorney, Agent, or Firm*—Harrity & Harrity, LLP

(57) ABSTRACT

A high speed transmission system transfers data streams over a set of data links. Each data link may carry a number of bit streams. A clock signal is not transmitted over the optical link. Instead, an indication of the appropriate clock signal frequency and please is embedded in the transmitted data. At the receiving end, a clock signal of an appropriate frequency and phase is generated. The new clock signal is used to sample and reconstruct the original data streams.

20 Claims, 5 Drawing Sheets

SOURCE SYNCHRONOUS LINK WITH CLOCK RECOVERY AND BIT SKEW ALIGNMENT

RELATED APPLICATION

This application is a continuation of U.S. patent application Ser. No. 09/879,176 filed Jun. 13, 2001, now U.S. Pat. No. 7,061,939 the entire disclosure of which is incorporated herein by reference.

BACKGROUND OF THE INVENTION

A. Field of the Invention

The present invention relates generally to high-speed data transmission, and more particularly, to a source synchronous data transmission link.

B. Description of Related Art

Conventional communication systems typically use either synchronous or asynchronous data transmission to transmit data from a transmitting system to a receiving system. Synchronous data transmission requires the transmitting and receiving systems to be synchronized with each other.

Conventional synchronous data transfer has the characteristic of requiring relatively constant time periods between successive events. Keeping time periods relatively constant, such as the time between successive bits, allows end systems to stay synchronized because the timing of successive events is predetermined.

To implement synchronous data transfer, the transmitting and receiving systems can be synchronized in a variety of ways. In some synchronous data transmission systems, for example, the transmitting and receiving ends share a common master clock. Because the end systems are synchronized with each other, synchronizing information does not need to be sent with the data. Although synchronous data transfer has many advantages, the precise clocks and timing requirements are very costly.

For asynchronous data transfer, data can be transmitted at irregular intervals. There is no clocking signal in asynchronous data transfer. Transferring data at irregular intervals, however, requires insertion of start and stop bits to mark the beginning and end, respectively, of the data stream. The receiving system uses the start and stop bits to determine when data is being received. Thus, although asynchronous data transfer is less costly in terms of clocks and maintaining timing, it lowers bandwidth because of the overhead of start and stops bits in the transmitted data. Therefore, conventional synchronous and asynchronous data transmission systems each have disadvantageous.

Accordingly, it is desirable to efficiently transmit data signals between devices without the disadvantages of conventional synchronous or asynchronous data transmission systems.

SUMMARY OF THE INVENTION

Systems and methods consistent with the invention address, among other things, the need to efficiently transmit data by improving the density of links connecting a plurality of signals.

One aspect is directed to a method for transmitting information. The method includes combining a first set of data signals to obtain a first serialized output data signal and combining a second data signal with a complement of the second data signal to obtain a second serialized output data signal whereby the second data output signal is guaranteed to include a signal edge that occurs at least once every other clock cycle. The method her includes transmitting the first and second serialized data signals over one or more links to a destination configured to deserialize the first and second serialized output data signals based on a clock signal generated from the second serialized output data signal.

Another aspect is directed to a method for receiving information. The method includes receiving information from a set of links and converting the information to at least a first data signal and a second data signal. The method further includes generating a clock signal based on a detection of repeating edges in the first data signal and demultiplexing the first data signal, based on the clock signal, to convert the first data signal into third and fourth data signals, the third data signal being a complement of the fourth data signal. The method further includes demultiplexing the second data signal, based on the clock signal, to convert the second data signal into fifth and sixth data signals, the fifth and sixth data signals being independent of one another.

Yet another aspect is directed to a method for transmitting information over a link. The method includes receiving data signals at a predetermined rate; periodically inserting a predetermined pattern into the received data signals and outputting the data signals to a set of data lines; multiplexing subsets of the set of data lines to obtain a set of combined data signals; multiplexing one of the data lines with a complement of the one of the data lines to generate a second combined data signal; and transmitting the set of combined data signals and the second combined data signal over the link.

Yet another aspect is directed to a method for receiving information. The method includes receiving asynchronous information from a link; outputting the information over a set of data lines; generating a clock signal based on a first of the set of data lines; and demultiplexing the output information on the first of the set of data lines into first and second data signals, the first and second data signals being complements of one another. The method further includes demultiplexing the output information on a second of the set of data lines into third and fourth data signals based on the generated clock signal.

Additional aspects of the principles of the invention are evident from the following description and the claims.

BRIEF DESCRIPTION OF THE DRAWINGS

The accompanying drawings, which are incorporated in and constitute a part of this specification, illustrate the principles of the invention and, together with the description, explain principles of the invention. In the drawings.

DETAILED DESCRIPTION

The following detailed description of the invention refers to the accompanying drawings. The same reference numbers are sometimes used in different drawings to identify the same or similar elements. Also, the following detailed description does not limit the invention. Instead, the scope of the invention is defined by the appended claims and equivalents of the claim limitations.

As described herein, a transmission system converts a plurality of synchronous signals for transmission onto a physical link. In one embodiment, transmission bandwidth is increased by embedding a clock signal in the converted signals.

Figure 1:
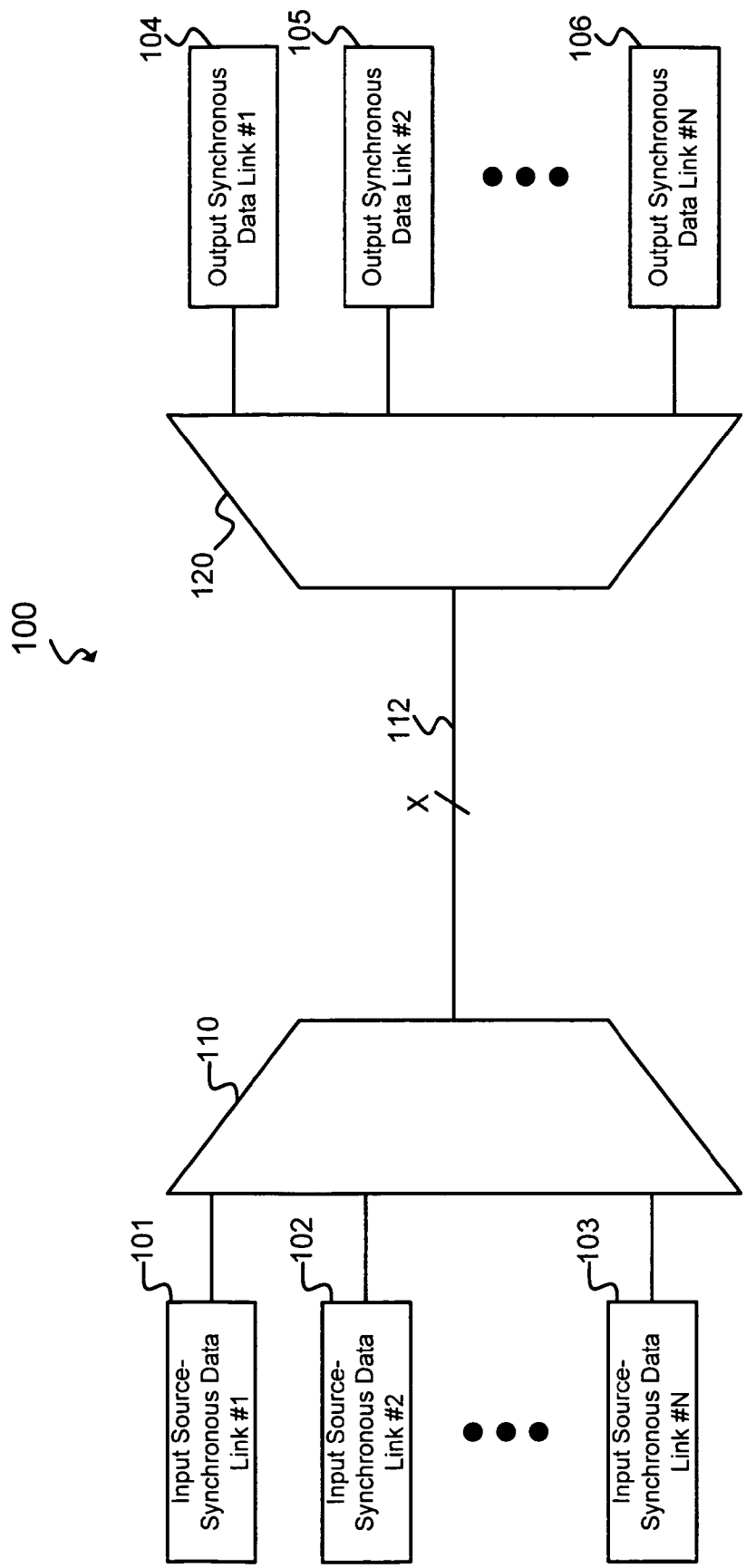
FIG. 1 is a block diagram illustrating a data transmission system consistent with the principles of the invention.

FIG. 1 is a block diagram illustrating a data transmission system 100 consistent with the principles of the invention. Data transmission system 100 includes N input synchronous data links 101-103, a multiplexing unit 110, a link 112, a demultiplexing unit 120, and N output synchronous data links 104-106. Each data link 101-103 may carry data signals transmitted synchronously with a clock signal. Multiplexing unit 110 combines data streams from data links 101-103 into single streams and transmits the single streams over link 112. In one embodiment, link 112 is an optical link containing a number of optical fibers. Demultiplexing unit 120 demultiplexes the single streams received from optical link 112 and outputs the demultiplexed data on output data links 104-106.

Figure 2:
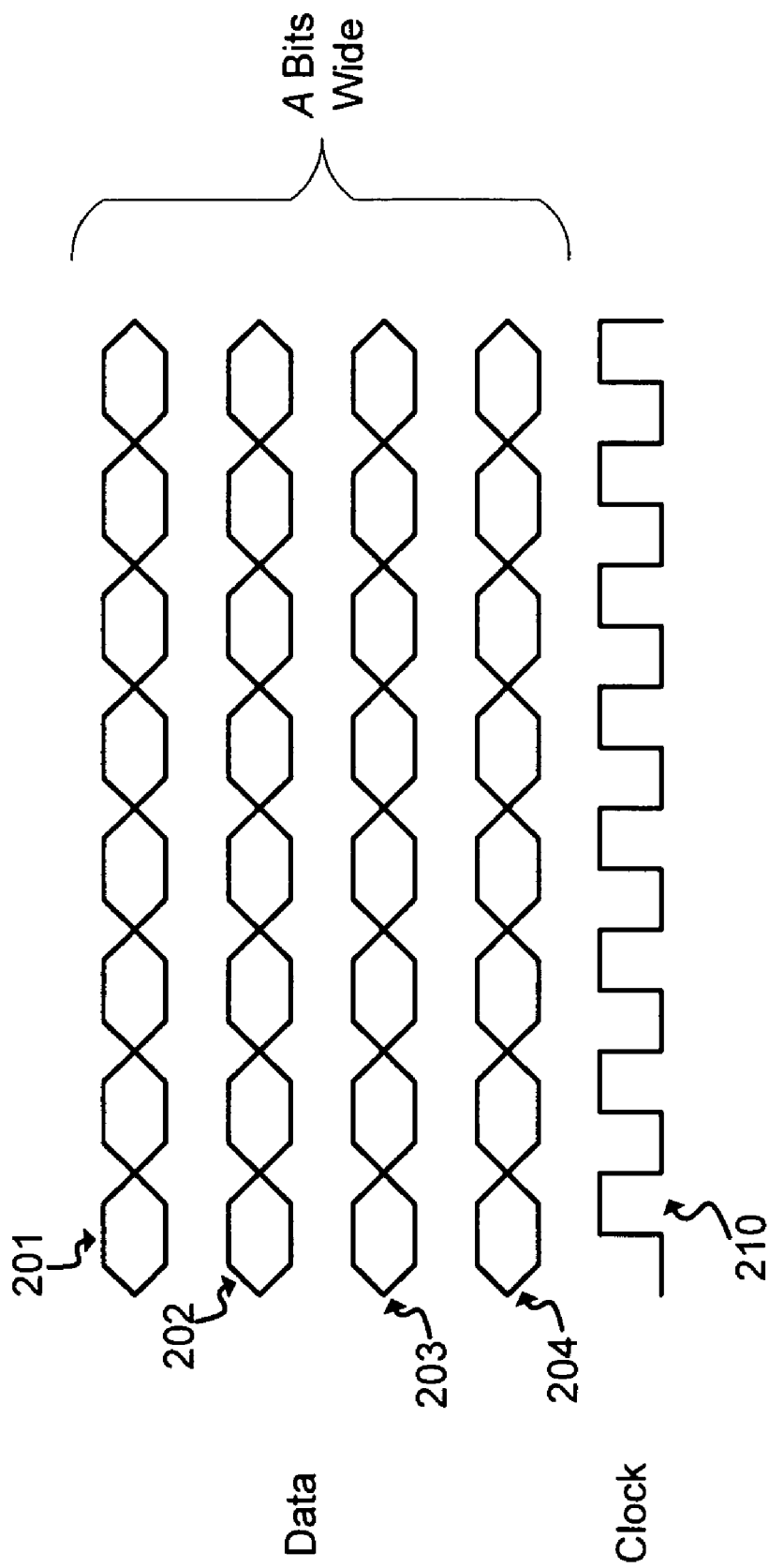
FIG. 2 is a diagram illustrating an example of input data links from FIG. 1.

FIG. 2 is a diagram illustrating an example of data bit streams and clock signals for one of data links 101-103. In the illustrated embodiment, there are four data bit streams 201-204 and a clock signal 210. Data bit streams 201-204 are transmitted synchronously with clock signal 210. In the illustrated embodiment, for each clock cycle, bit streams 201-204 together define an A-bit wide data word, where A in the embodiment of FIG. 2 is four. In an embodiment having three data links (N=3), there would be twelve (N·A) bits of information transmitted per clock cycle.

In one embodiment, clock signal 210 of each of data links 101-103 is an independent clock signal running at the same frequency as the clock signals (or a multiple of the frequency of the clock signals) for the other data links. Each clock signal 210 may, however, be an independent clock signal in which the phase of each clock relative to each other may vary.

Returning to FIG. 1, multiplexing unit 110 may perform a number of functions, including combining multiple data bit streams 201-204 and transmitting the combined streams on link 112. Clock signal 210 is not transmitted over link 112. Instead, multiplexing unit 110 embeds an indication of clock signal 210 in the transmitted data bits. Some bits may be scrambled and have a probabilistic embedding of the clock signal that is preset in data bit streams 201-204. Demultiplexing unit 120 recovers the clock signal and demultiplexes the combined data streams into output data links 104-106. By not sending clock signal 112 over link 112, clock skew which may have otherwise been introduced by link 112 is avoided and fewer pins may be used.

In one embodiment, multiplexing unit 110 is implemented within a first physical chassis, such as a router chassis, and demultiplexer unit 120 is implemented within a second physical chassis, such as a second router chassis. In this embodiment, link 112 connects the two router chassis.

Figure 3:
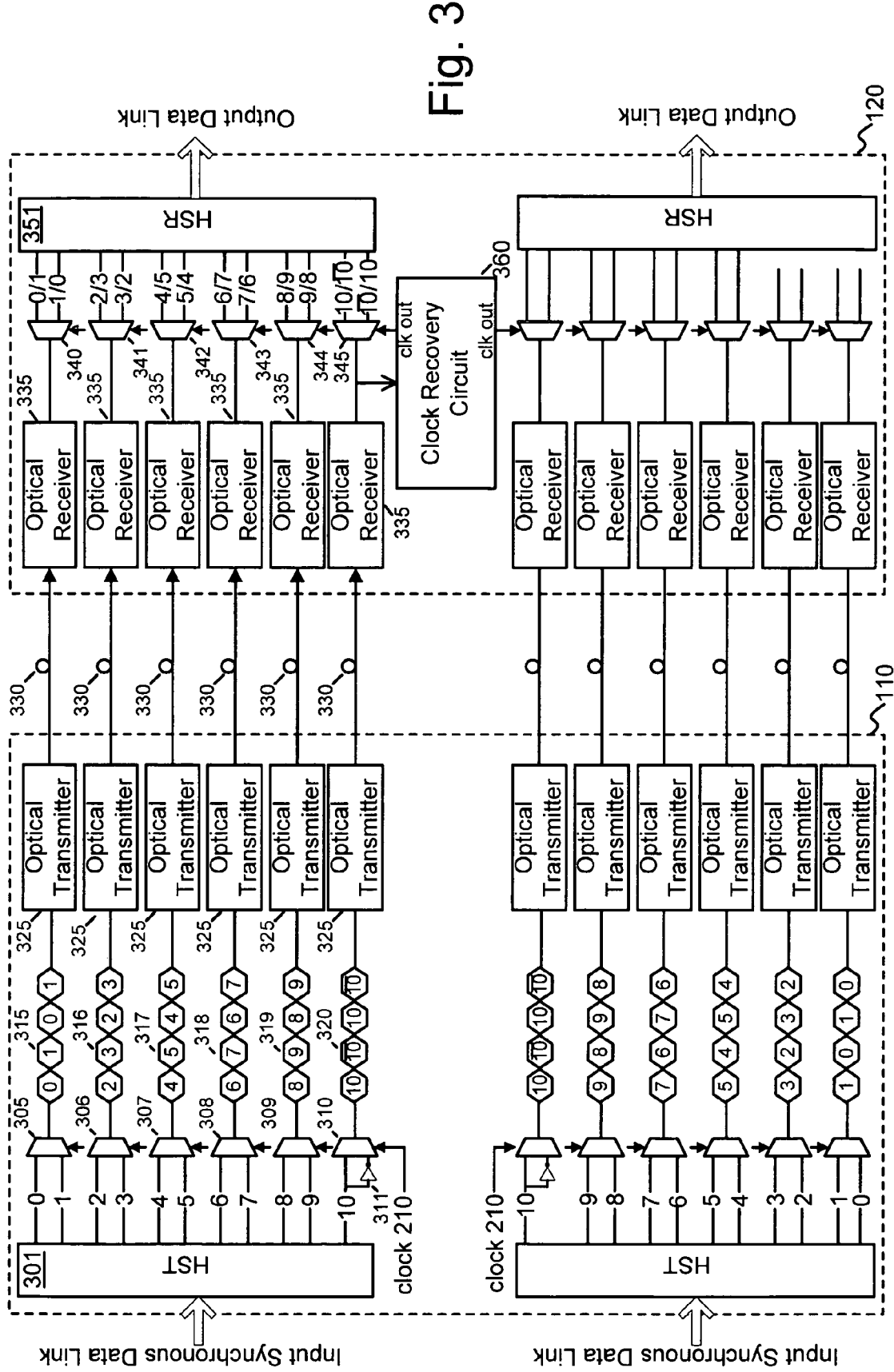
FIG. 3 is diagram illustrating examples of portions of the electrical-optical data transmission system of FIG. 1.

Multiplexing unit 110, demultiplexing unit 120, and link 112 will now be described with reference to FIG. 3. In FIG. 3, two synchronous data links are illustrated, each eleven bit streams wide (i.e., A=11), labeled as bit lines zero through ten. The description of FIG. 3 describes the upper input synchronous data link. The lower synchronous data link operates in a similar manner.

High speed transmitter (HST) 301 receives bit streams from a data link, such as data link 101, processes the bit streams, and forwards the bit streams to multiplexers 305-310. The bit streams are combined by multiplexers 305-310, converted into optical signals by optical transmitters 325, transmitted over optical fibers 330, converted back to an electrical signal by optical receivers 335, and processed and reassembled into the original data by demultiplexers 340-345 and high speed receiver (HSR) 351.

Multiplexing unit 110 and demultiplexing unit 120 may additionally include corresponding scramblers (not shown) and descramblers (not shown), respectively, to scramble data transmitted over fibers 330.

Each of multiplexers 305-309 receives from HST 301 two bit streams of the eleven incoming bit streams and combines the two bit streams into combined bit streams 315-319. In one embodiment, multiplexers 305-309 interleave each input bit stream. For example, bit stream 315 contains alternating bits from bit stream number zero and bit stream number one, and is clocked at twice the frequency of the signals entering HST 301. For example, the bit streams received by HST 301 and multiplexers 305-310 may be clocked at 937 million bits per second (Mbps) while the data transmitted from multiplexers 305-310 may be clocked at 1874 Mbps.

Multiplexer 310 operates slightly differently than multiplexers 305-309. Multiplexer 310 receives only one bit stream directly, bit stream 10. The input to multiplexer 310 includes an inverter 311. Accordingly, bit stream 320 alternates between the bit value of bit stream 10 and its complement. Because each bit is followed by its complement, bit stream 320 is guaranteed to include an edge every other clock signal. Although bit streams 315-320 are illustrated in FIG. 3 as a multiplexed stream made from two constituent streams, in alternate implementations three or more streams may be combined into a single stream.

The optical transceiving system that includes optical transmitters 325, optical fibers 330, and optical receivers 335 transmit the combined data streams 315-320 to demultiplexing unit 120. More particularly, optical transmitters 325 receive the combined data streams 315 through 320 and convert the electrical signals into optical signals for transmission over optical fibers 330. The optical signals, after traveling over the optical fibers 330, are converted back to electrical signals by optical receivers 335.

The clock signal is not transmitted over optical fibers 330. Instead, clock recovery circuit 360 derives a clock signal based on combined stream 320 after it is output by the optical receiver 335 carrying combined stream 320. Because each bit in signal 320 is followed by its complement, the signal includes an edge every other clock cycle. Clock recovery circuit 360 uses the presence of the regularly repeating edge to determine the clock frequency and the phase of the clock for the transmitted data. More particularly, clock recovery circuit 360 derives from combined stream 320 a clock out signal having the same frequency as the transmitting clock and in phase with combined data stream 320.

The clock out signal may be shared by both HSR 351 and the lower HSR shown in FIG. 3. The clock out signal generated by clock recovery circuit 360 is input to demultiplexers 340-345, which receive the combined data streams 315-320 from optical receivers 335. Based on the clock out signal, demultiplexers 340-345 separate the combined data streams into the constituent bit streams zero through ten, and the complement of bit stream 10. The de-serialization process may cause pairs of data bits, such as 0/1, 2/3, and 4/5, to become transposed.

Although clock recovery circuit 360 aligns the phase of the clock signal at the receiving end to the input data, the bit streams transmitted between HST 301 and HSR 351 may become misaligned with one another because, for example, the fiber may have different lengths and transmission properties. To address this potential problem, and to correct bit transposition, HST 301 and HSR 351 may periodically transmit preestablished alignment patterns that both HST 301 and HSR 351 recognize. Based on the received pattern, HSR 351 can check to ensure that all of its received bit streams are aligned and realign bit streams if necessary.

Figure 4:
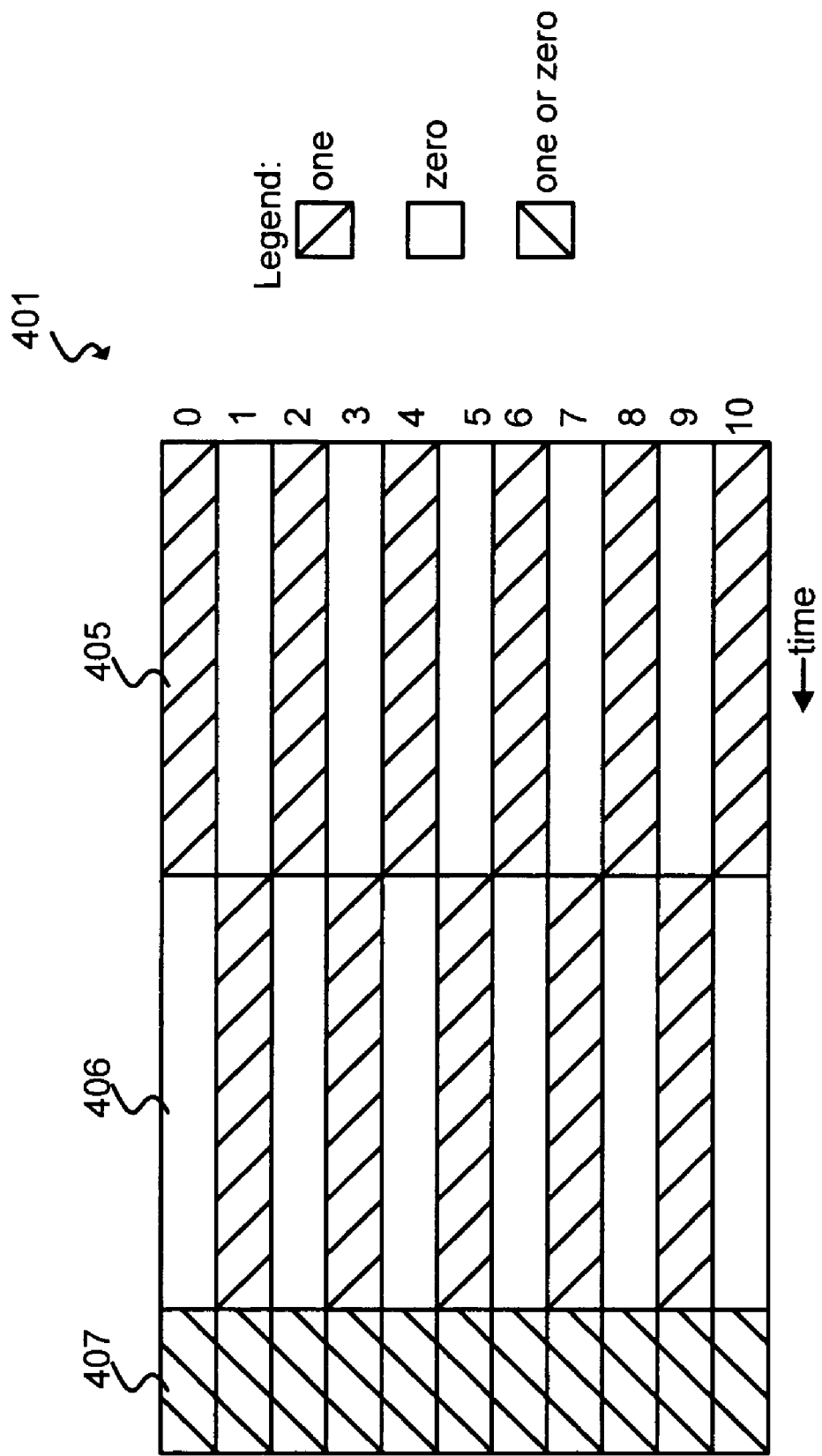
FIG. 4 is a diagram illustrating an exemplary alignment pattern for aligning received data bits consistent with the principles of the invention.

FIG. 4 is a diagram illustrating an exemplary alignment pattern 401 that may be used by HST 301 and HSR 351 consistent with the principles of the invention. Pattern 401 may have the property of being easily detected in the presence of skew and bit transposition. The pattern includes for each bit stream in the data link a number of consecutive bits 405 (e.g., 6) followed by an equal number of consecutive complementary bits 406. In one embodiment the pattern alternates between consecutive bit streams. Thus, as shown in FIG. 4, the pattern for bit streams 0, 2, 4, 6, 8, and 10 is a series of logic ones followed by a series of logic zeroes, while the pattern for bit streams 1, 3, 5, 7, and 9 is a series of logic zeroes followed by a series of logic ones. After the second series of bits, the pattern may include a message 407 such as a cyclic redundancy check (CRC) message.

In operation, HSR 351 monitors the incoming bit streams for any pattern which could have been a transmitted pattern 401 that was altered by bit skew or transposition of bits. Upon detecting the pattern, HSR 351 determines whether bit streams 0-10 are aligned. If any of the streams are out of alignment, such as if bit stream zero is shifted relative to bit stream one, HSR 351 adjusts bit stream state buffers within HSR 351 to align the bits to form pattern 401. To this end, HSR 351 may store recovered bits from each line in a FIFO (first-in-first-out) queue, each FIFO having a separate read pointer and having the ability to transpose adjacent bits.

Figure 5:
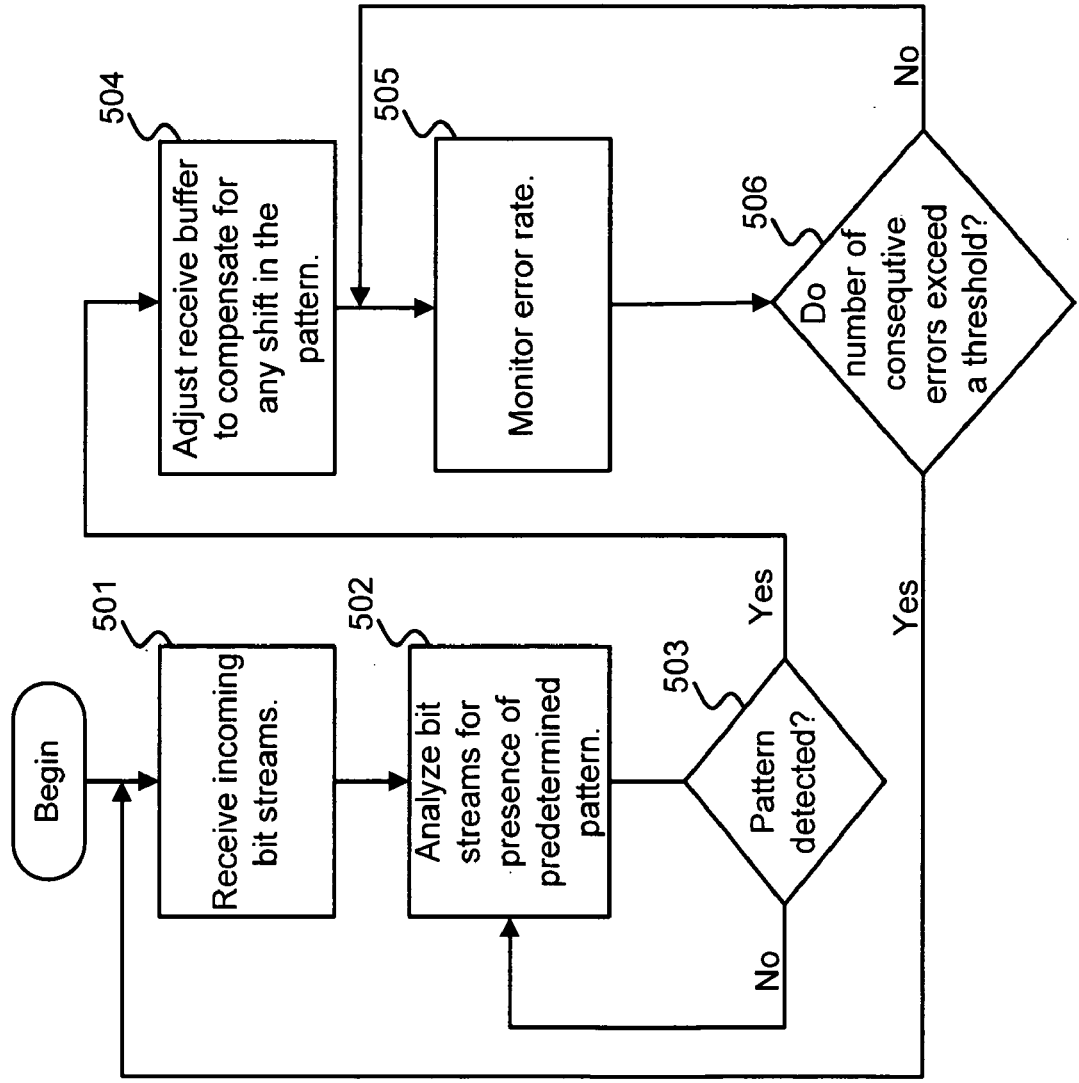
FIG. 5 is a flow chart illustrating methods associated with the alignment pattern shown in FIG. 4.

FIG. 5 is a flow chart illustrating operation of HSR 351 in processing alignment pattern 401. HSR 351 may being processing when a CRC error burst occurs that indicates an out-of-alignment condition. HSR 351 begins by receiving the incoming bit streams and analyzing the received bit streams for the presence of pattern 401. (Acts 501 and 502). Different ones of the bit streams may be received as shifted versions of the pattern. Accordingly, HSR 351 takes this fact into account when detecting the pattern 401. When the pattern is located, (Act 503), HSR 351 adjusts receive buffers within HSR 351 (not illustrated in FIG. 4) to compensate for any shift or transposition in the bit streams. (Act 504). Thus, for example, if the second bit stream is a cycle behind all of the other bit streams, HSR 351 may delete a bit in the buffer or double clock the buffer corresponding to the second bit stream to bring the second bit stream in alignment with the other bit streams. Acts 501 through 504 are repeated whenever the number of consecutive errors exceeds a threshold. (Acts 505 and 506). Errors may be detected through the CRC field.

As described above, consistent with the principles of the invention, data from a plurality of synchronous data links are serialized before being transmitted. A clock signal is not transmitted with the serialized data. Instead, a clock signal is generated at the receiving end of the optical link based on frequency and phase information embedded in the transmitted data.

The foregoing description of embodiments of the invention provides illustration and description, but is not intended to be exhaustive or to limit the invention to the precise form disclosed. Modifications and variations are possible in light of the above teachings or may be acquired from practice of the invention. Although described as being primarily implemented in hardware, the present invention may be embodied in hardware and/or in software (including firmware, resident software, micro-code, etc.).

The scope of the invention is defined by the claims and their equivalents.

What is claimed is:

1. A method for transmitting information, the method comprising:
   combining a first plurality of data signals to obtain a first serialized output data signal;
   combining a second data signal with a complement of the second data signal to obtain a second serialized output data signal, where the second data output signal is guaranteed to include a signal edge that occurs at least once every other clock cycle; and
   transmitting the first and second serialized data output signals over one or more links to a destination configured to deserialize the first and second serialized output data signals based on a clock signal generated from the second serialized output data signal.

2. The method of claim 1, where the one or more links include optical links.

3. The method of claim 1, further comprising:
   receiving the first plurality of data signals synchronously with a first clock signal running at a predetermined frequency.

4. The method of claim 1, where combining a second data signal with a complement of the second data signal includes:
   inverting the second data signal to obtain the complement of the second data signal.

5. The method of claim 1, where transmitting the first and second serialized output data signals includes:
   transmitting the first and second serialized output data signals asynchronously over the one or more links.

6. A method for receiving information, the method comprising:
   receiving information from a plurality of links;
   converting the information to at least a first data signal and a second data signal;
   generating a clock signal based on a detection of repeating edges in the first data signal;
   demultiplexing the first data signal, based on the clock signal, to convert the first data signal into third and fourth data signals, the third data signal being a complement of the fourth data signal; and
   demultiplexing the second data signal, based on the clock signal, to convert the second data signal into fifth and sixth data signals, the fifth and sixth data signals being independent of one another.

7. The method of claim 6, where the plurality of links include optical links.

8. The method of claim 6, where receiving information from the plurality of links includes:
   receiving the information asynchronously over the plurality of links.

9. The method of claim 6, further comprising:
   synchronously transmitting the fifth and sixth data signals.

10. A method for transmitting information over a link, the method comprising:
    receiving data signals at a predetermined rate;
    periodically inserting a predetermined pattern into the received data signals and outputting the data signals to a plurality of data lines;
    multiplexing subsets of the plurality of data lines to obtain a plurality of combined data signals;
    multiplexing one of the plurality of data lines with a complement of the one of the plurality of data lines to generate a second combined data signal; and
    transmitting the plurality of combined data signals and the second combined data signal over the link.

11. The method of claim 10, where the link is an optical link.

12. The method of claim 10, where transmitting the plurality of combined data signals includes synchronously transmitting the plurality of combined data signals.

13. The method of claim 10, wherein where receiving the data signals includes asynchronously receiving the data signals.

14. A method for receiving information, the method comprising:
   receiving asynchronous information from a link;
   outputting the asynchronous information over a plurality of data lines;
   generating a clock signal based on a first of the plurality of data lines;
   demultiplexing the output asynchronous information on the first of the plurality of data lines into first and second data signals, the first and second data signals being complements of one another; and
   demultiplexing the output asynchronous information on a second of the plurality of data lines into third and fourth data signals based on the generated clock signal.

15. The method of claim 14, further comprising:
   receiving the third and fourth data signals and analyzing the third and fourth data signals for a presence of a predetermined pattern, the predetermined pattern being used to align bits and correct transposed bits in the third and fourth data signals.

16. The method of claim 15, where the predetermined pattern includes a number of consecutive bits followed by a number of consecutive complementary bits.

17. The method of claim 15, further comprising:
   detecting transposed bits in the third and fourth data signals; and
   adjusting a receive buffer to compensate for the detected transposed bits.

18. The method of claim 14, where the generating a clock signal includes:
   determining a clock frequency and a phase of a clock for the first of the plurality of data lines.

19. The method of claim 14, where the link includes an optical link.

20. The method of claim 14, where the third and fourth data signals are independent of one another.

* * * * *